US009905942B2

United States Patent
Cox et al.

(10) Patent No.: US 9,905,942 B2
(45) Date of Patent: Feb. 27, 2018

(54) ASSEMBLIES AND METHODS FOR ELECTRICAL SPLICE CONNECTIONS OF CABLES

(71) Applicant: PRYSMIAN S.p.A., Milan (IT)

(72) Inventors: Stuart Cox, Eastleigh (GB); Janos Kadar, Chester (GB)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/021,988

(22) PCT Filed: Sep. 16, 2013

(86) PCT No.: PCT/EP2013/069186
§ 371 (c)(1),
(2) Date: Mar. 15, 2016

(87) PCT Pub. No.: WO2015/036060
PCT Pub. Date: Mar. 19, 2015

(65) Prior Publication Data
US 2016/0226158 A1 Aug. 4, 2016

(51) Int. Cl.
*H01R 4/30* (2006.01)
*H01R 4/20* (2006.01)
(Continued)

(52) U.S. Cl.
CPC ............ *H01R 4/305* (2013.01); *H01R 4/20* (2013.01); *H01R 4/206* (2013.01); *H01R 4/363* (2013.01);
(Continued)

(58) Field of Classification Search
CPC .......... H01R 11/01; H01R 4/20; H01R 4/206; H01R 4/305; H01R 4/363; H01R 43/048;
(Continued)

(56) References Cited

U.S. PATENT DOCUMENTS 3,377,422 A * 4/1968 Trimble ............... H02G 15/013
174/138 F
3,864,013 A * 2/1975 Levy ........................ H01R 4/20
174/84 C
(Continued)

FOREIGN PATENT DOCUMENTS

DE 10-2007-022415 A1 11/2008
EP 1253692 A1 10/2002
(Continued)

OTHER PUBLICATIONS

International Search Report PCT/ISA/210 for International Application No. PCT/EP2013/069186 dated May 14, 2014.
(Continued)

*Primary Examiner* — Michael F McAllister
(74) *Attorney, Agent, or Firm* — MH2 Technology Law Group, LLP (57) ABSTRACT

An assembly for electrical splice connection of cables may include: a first connector, including a first spigot and first crimping portion, configured to be crimped onto a first cable conductor; a second connector, including a second spigot and second crimping portion, configured to be crimped onto a second cable conductor; a first open shell configured to accommodate the first and second spigots; and/or a second open shell configured to be fastened to the first open shell to wrap and hold the first and second spigots. A method for electrical splice connection of the cables may include: crimping the first crimping portion onto the first cable conductor; crimping the second crimping portion onto the second cable conductor; accommodating the first and second spigots on the first open shell; and/or fastening the second open shell to the first open shell to wrap and hold the first and second spigots.

18 Claims, 9 Drawing Sheets

(51) Int. Cl.
*H01R 4/36* (2006.01)
*H01R 11/01* (2006.01)
*H01R 43/048* (2006.01)
*H01R 11/26* (2006.01)
*H02G 15/18* (2006.01)

(52) U.S. Cl.
CPC ............. *H01R 11/01* (2013.01); *H01R 11/26* (2013.01); *H01R 43/048* (2013.01); *H02G 15/18* (2013.01)

(58) Field of Classification Search
CPC . H01R 4/30; H01R 4/36; H01R 13/62; H01R 4/38; H01R 13/22; H02G 15/18; H01B 11/11; H01B 13/22; H01B 4/44
See application file for complete search history.

(56) References Cited

U.S. PATENT DOCUMENTS

| | | | |
|---|---|---|---|
| RE28,877 E | 6/1976 | Pertuit | |
| 4,269,465 A * | 5/1981 | Mueller | H01R 4/36 439/431 |
| 5,041,027 A * | 8/1991 | Lien | H01R 13/53 174/84 S |
| 5,821,463 A * | 10/1998 | Ngo | H01R 4/26 174/84 C |
| 7,195,504 B2 | 3/2007 | Bertini et al. | |
| 2012/0247805 A1* | 10/2012 | Montena | H01R 4/646 174/78 |
| 2012/0324727 A1* | 12/2012 | Seifert | H01R 4/187 29/867 |
| 2013/0056268 A1 | 3/2013 | Bumgarner | |

FOREIGN PATENT DOCUMENTS

| | | | |
|---|---|---|---|
| EP | 1988604 A2 | | 11/2008 |
| FR | 2662846 | * | 6/1991 |
| GB | 0913503 A | | 12/1962 |
| GB | 2251984 A | | 7/1992 |
| GB | 2294597 | * | 5/1996 |
| GB | 2294597 A | | 5/1996 |
| WO | WO-2008/138299 A1 | | 11/2008 |

OTHER PUBLICATIONS

Written Opinion of the International Searching Authority PCT/ISA/237 for International Application No. PCT/EP2013/069186 dated May 14, 2014.
Office Action for European Appl No. 13 762 511.7-1601 dated Feb. 23, 2017.

* cited by examiner

FIG.11

ASSEMBLIES AND METHODS FOR ELECTRICAL SPLICE CONNECTIONS OF CABLES

CROSS-REFERENCE TO RELATED APPLICATION(S)

This application is a national stage entry from international Application No. PCT/EP2013/069186, filed on Sep. 16, 2013, in the Receiving Office of the European Patent Office, and published on Mar. 19, 2015, as International Publication No. WO 2015/036060 A1, the entire contents of which are incorporated herein by reference.

The present invention relates to an assembly and a method for electrical splice connection of cables.

In generation and transmission energy networks, connectors may join two lengths of cable (splice connectors) or connect a cable to an electrical apparatus (terminal connectors).

Splice connectors typically comprise a metallic body configured to accommodate and firmly lock in position the end portions of the conductors (or cores) of the two cables to be electrically connected. The desired electrical connection is obtained through a mechanical connection of the cable conductors with a socket provided in the abovementioned metallic body.

Terminal connectors typically comprises a metallic body configured to accommodate and firmly lock in position the end portion of the conductors (or cores) of the two cable to be electrically connected to the electrical apparatus, and an elongated metallic portion suitable to be inserted in a socket of the electrical apparatus to realize the contact.

Throughout the present description and in the subsequent claims, the terms "conductors" is used to indicate a single metallic wire, or a strand formed by a plurality of metallic wires, configured to carry on the electrical power. The wire/s is/are typically made of copper or aluminium or a combination thereof.

The expressions "radially inner" and "radially outer" are used herein by referring to a closer position and farther position, respectively, to a reference longitudinal axis of the connector, said position being taken along a direction perpendicular to said longitudinal axis.

The expressions "axially inner" and "axially outer" are used herein by referring to a closer position and farther position, respectively, to a reference plane perpendicular to said longitudinal axis and defined at a central portion of the connector, said position being taken along a direction parallel to the aforementioned longitudinal axis.

The connectors can be classified in two main categories: compression (or crimp) connectors and bolted (or screwed) connectors.

In the compression connectors the end portion of the cable conductors are firmly locked in position within the connector socket by crimping the connector onto the cable conductors.

In the bolted connectors the end portion of the cable conductors are firmly locked in position within the connector socket by exerting a desired pressure onto the cable conductors through suitable bolts (or screws) inserted into through holes formed in the connector. Shear bolts are widely used, these bolts having a head designed to shear when the bolt is subjected to a predetermined torsion load.

The sockets of bolted connectors may be in form of a channel or of halves or shells to be joined to form a channel, as from the documents discussed in the following.

The Applicant observed that the compression connectors are size specific, so that a plurality of compression connectors of different sizes needs to be provided and carried on by the installers as a stock for connecting two cable conductors of any size. In addition thereto, large diameter cable conductors require high crimping forces, this in turn requiring the use of heavy and/or bulky special crimping tools, as for example hydraulic compression heads, to comply with the manufacture's specifications. Such tools imply transportation problems in case of remote installation areas as well as manoeuvring problems when only limited space is available at the installation area. Furthermore, connecting different diameter cables and different material cables by compression connectors require using stepped connectors and bimetallic connectors, respectively, which are costly. Moreover, it is difficult to insert a free cable end into the compression connector after another free cable end is already crimped by the same compression connector.

The Applicant further observed that in bolted connectors the bolts can both damage the conductor wires or strands and cause an undesired displacement thereof. Such displacement can, in turn, cause the bolts to travel too deep inside the conductor wires or strands and fail to firmly lock in position the cable conductors. Moreover, small diameter cable conductors usually offsets within the connector, such an offset causing an increase of mechanical stresses on the cable conductors. Furthermore, if shear bolts are used, the above displacement can cause the bolts to fail shearing or to shear at incorrect points, thus creating undesired sharp edges in the connectors. In addition thereto, when split connectors are used, the two connectors usually need to be oriented at the installation area in order to connect with each other. This leads to undesired cable twisting and/or bending which, especially in case of installation areas with space restrictions or limitations, can cause undesired extra stress induced into the cable. Moreover, electrical contact is only made on a limited area of the cable conductor surface.

U.S. Pat. No. 7,195,504 shows examples of crimp connector, both as splice or terminal connector. Splice connector is used to connect two cable segments by inserting each strand conductor into opposite side of the crimp connector. The terminal connector comprises a housing, having internal teeth, integral with a termination crimp connector portion which is crimped to a conductor to provide electrical communication therewith.

A bolted splice connector is described in GB 2 251 984. This connector has a socket comprising an open channel member into which the end of a conductor may be laid, a cover member which, together with the open channel member, surrounds the end of the conductor, and a sleeve member fitting, in use, around the open channel member and the cover member. The cover member and the sleeve member have corresponding apertures which together constitute a threaded bore through which extends a locking screw for releasably securing the end of the electrical conductor to the open channel member.

Another bolted splice connector is described in DE 10 2007 022 415. This connector has an electrically conductive closure element for receiving the ends of cables and two insulators. The electrically conductive closure element comprises three sections, of which a first external section is designed as a clamping section for receiving a first cable core, a second external section is designed as a clamping section for receiving a second cable core, and a central section extending between the two external sections is designed as a receiving section for receiving and arresting an insulator. The first external section can be designed as a socket with a front side opening designed as a bore for receiving the first cable core. The second external section is constructed from two complementary half-shells that can be coupled with each other for receiving the second cable core. Each of the two half-shells comprises a bore for receiving a shear bolt. The cable cores are held in the respective clamping section by shear bolts inserted in the respective bores.

The Applicant observed that splice connectors of the above prior art documents have at least some of the problems discussed above. Indeed, the bolts operate directly onto the cable conductors, which can thus move or also get damaged. Furthermore, the known splice connectors are size specific.

The Applicant found a combination of crimp connectors, mechanical connectors and jointing shells to form a cable splice connector assembly solving the above discussed problems.

The Applicant obtained an effective and reliable mechanical and electrical cable splice connection by providing each cable conductor with a crimp connector and a termination portion or spigot designed to fit into the channel formed by the jointing shells once fastened to each other.

The jointing shells are configured to wrap the two spigots and to be fastened to each other, thereby firmly holding in position the spigots and the cable conductors associated thereto.

The coupling between spigots and open shells provides for mutually jointing the two connectors at the installation area with no orientation constraints. This avoids possible bend and torsion stresses on the cables during the connection operation and it is a benefit, for example, in vertical installation where orientation of the connector is important or where there are restrictions or limitations for accessing and manoeuvring at the installation area.

Spigots have a cross-sectional size which is independent from the diameter of the conductors they are intended to be coupled to. This allows having a connector with jointing shells having a given or predetermined cross-sectional size to be used for connecting cables of any size without needing stepped connectors. Spigots can have similar or same shape and size (diameter and length), thus allowing using jointing shells having similar or same shape and size (diameter and length).

Spigots can be of the same material irrespective from the conductor material. This allows different cable conductor materials to be joined without needing bimetallic connectors.

The spigots of the splice connector assembly can be shaped to realize the electrical contact over a large area of the cable conductor surface.

The crimp connectors can be associated with the cable conductors at different time and remote locations. This allows operating at the installation area on pre-connectorized cables and, consequently, reducing the operations to be carried out at the installation area and correlated, for example, with the use of heavy and bulky tools, which is highly desired in case of installation areas with space restrictions or limitations.

Specific advantages are obtained when using bolted connectors as mechanical connectors. In this case the spigots bear the pressure exerted by the bolts jointing the shells. The provision of spigots avoids any possible conductor damage caused by the bolts coupling the jointing shells. Indeed, the bolts would press onto the spigots with no risk of having undesired displacements of the conductors and/or undesired offsets of small diameter cable conductors.

Accordingly, in a first aspect thereof, the present invention relates to an assembly for electrical splice connection of cables, comprising:
- a first connector comprising a first spigot and a first crimping portion configured to be crimped onto a first cable conductor;
- a second connector comprising a second spigot and a second crimping portion configured to be crimped onto a second cable conductor;
- a first open shell configured to accommodate said first and second spigots;
- a second open shell configured to be fastened to said first open shell so as to wrap and hold in position said first and second spigots.

In a second aspect thereof, the present invention relates to a method for electrical splice connection of cables, comprising:
- providing a first connector comprising a first spigot and a first crimping portion;
- providing a second connector comprising a second spigot and a second crimping portion;
- crimping said first crimping portion onto a first cable conductor;
- crimping said second crimping portion onto a second cable conductor;
- accommodating said first and second spigot on a first open shell;
- fastening a second open shell to said first open shell so as to wrap and hold in position said first and second spigot.

In at least one of the aforementioned aspects the invention can comprise at least one of the following preferred features, taken separately or in combination.

Spigots, crimping portions and open shells of the assembly of the invention are preferably made of metal.

Said first open shell and second open shell are preferably substantially identical to each other. This allows interchangeably using the first or the second shell for accommodating the first and second spigots or for wrapping and holding them after fastening with the other open shell. According the operation for connecting the cables is simplified as the operator must not select a specific shell for the accommodating and fastening steps.

The spigots of the assembly of the invention preferably have substantially the same shape. Said spigots preferably have substantially the same length and size. This allows an easier positioning of the first and second shells over the spigots.

The spigots are preferably substantially identical.

Preferably, each of said first open shell and second open shell has a substantially semi-cylindrical shape.

Preferably, each of said first spigot and second spigot has a substantially cylindrical shape.

Preferably, each of said first and second cable conductors has a respective predetermined cross-sectional size and each of said first crimping portion and second crimping portion has a cross-sectional size selected according to the cross-sectional size of a respective cable conductor of said first and second cable conductors.

Each of said first spigot and second spigot can comprise, at a respective free end portion thereof, an enlarged head. The enlarged head advantageously allows obtaining an electrical contact over a larger area.

Each of said first open shell and second open shell can comprise, at an axially central portion of a radially inner surface thereof, a respective recessed portion for accommodating the optionally provided spigot enlarged heads. This allows the spigots to be locked in position on the shells along the axial direction of the assembly.

Preferably, at least one of said first and second open shells comprises, at a radially inner surface thereof, a serration.

Said recessed portion can lack or comprise said serration.

Preferably, each of said first and second cable conductors has a predetermined cross-sectional size and each of said first spigot and second spigot has a cross-sectional size which is equal to, or greater than, the cross-sectional size of a respective cable conductor of said first and second cable conductors.

Preferably, said first and second cable conductors are made of a respective predetermined material and each of said first and second crimping portion is made of the same material of a respective cable conductors of said first and second cable conductors.

The first and second open shells can be fastened one another by using clamps or snap fit members. Clamps or snap fit members are more suitable for connecting low or even medium voltage cables.

For the purposes of the invention the term "medium voltage" generally means a voltage of between 1 kV and 35 kV, whereas "high voltage" means voltages higher than 35 kV.

In a different embodiment, the assembly of the invention comprises an outer sleeve configured to at least partly surround said first open shell and said second open shell. The outer sleeve can be configured to totally surround the first and second shell.

The outer sleeve preferably comprises at least two first through holes, each of said at least two first through holes being intended to be aligned to a respective through hole of at least two second through holes formed on at least of the first open shell and said second open shell.

The assembly preferably further comprises at least one locking screw.

When the above outer sleeve is present, the method of the invention preferably comprises the step of positioning the outer sleeve in a radially outer position with respect to the first open shell and second open shell, aligning each of the first through holes to a respective one of said second through hole and inserting a locking screw into each of said first through holes and second through holes. This allows exerting a predetermined pressure onto said first and second spigots, thus steadily holding in position the spigots within the shells.

When the above outer sleeve is present, the method of the invention preferably comprises, before performing the steps of accommodating the first and second spigots on the first open shell and fastening the first and second open shells to wrap and hold in position the spigots, the step of sliding said sleeve over one of the cable to be connected.

Preferably, the locking screw is a shear bolt.

Preferably, accommodating said first and second spigots on said first open shell comprises accommodating said enlarged head onto said recessed portion.

Further features and advantages of the present invention will appear more clearly from the following detailed description of a preferred embodiment thereof, such description being provided merely by way of non-limiting example and being made with reference to the annexed drawings. In such drawings.

In FIGS. 1-8, an embodiment of an assembly for electrical splice connection of two cables according to the present invention is indicated with numeral reference 10. The two cables (more specifically an end portion of each of the two cables) are indicated with numeral references 100a, 100b in FIGS. 5-8.

In the assembled configuration thereof, assembly 10 extends coaxially to a longitudinal axis X-X.

In the specific exemplary embodiment herein shown, the structure of the two cables 100a, 100b is similar. However, cables of different structures (different materials and/or different cross-sectional sizes) can be connected to each other by the assembly 10.

The structure of the cables 100a, 100b will be described with specific reference to FIGS. 2-4, wherein just cable 100a (more specifically an end portion thereof) is shown. What stated with reference to cable 100a also applies to cable 100b.

Cables 100a, 100b comprise, at a radially inner portion thereof, metallic conductors 101a, 101b, respectively. A protective sheath 102a, 102b of electrically insulating polymeric material is coaxially applied at a radially outer position with respect to the conductors 101a, 101b.

Between conductors 101a, 101b and protective sheath 102a, 102b, moving from the conductors 101a, 101b towards the protective sheath 102a, 102b, further layers (not shown) may be provided as well as one or more conductive screens (not shown). For example one semi-conductive layer (not shown) can be radially interposed between the conductor and the insulating layer.

Assembly 10 is configured to electrically connect cables 100a, 100b with each other by mechanically connecting conductors 101a, 101b with each other. To this end, the end portion of the conductors 101a, 101b is exposed by removing a predetermined length of protective sheath 102a, 102b (and of any further layer/screens optionally present) at the end portion of each cable 100a, 100b, as shown in FIG. 2.

Figure 1:
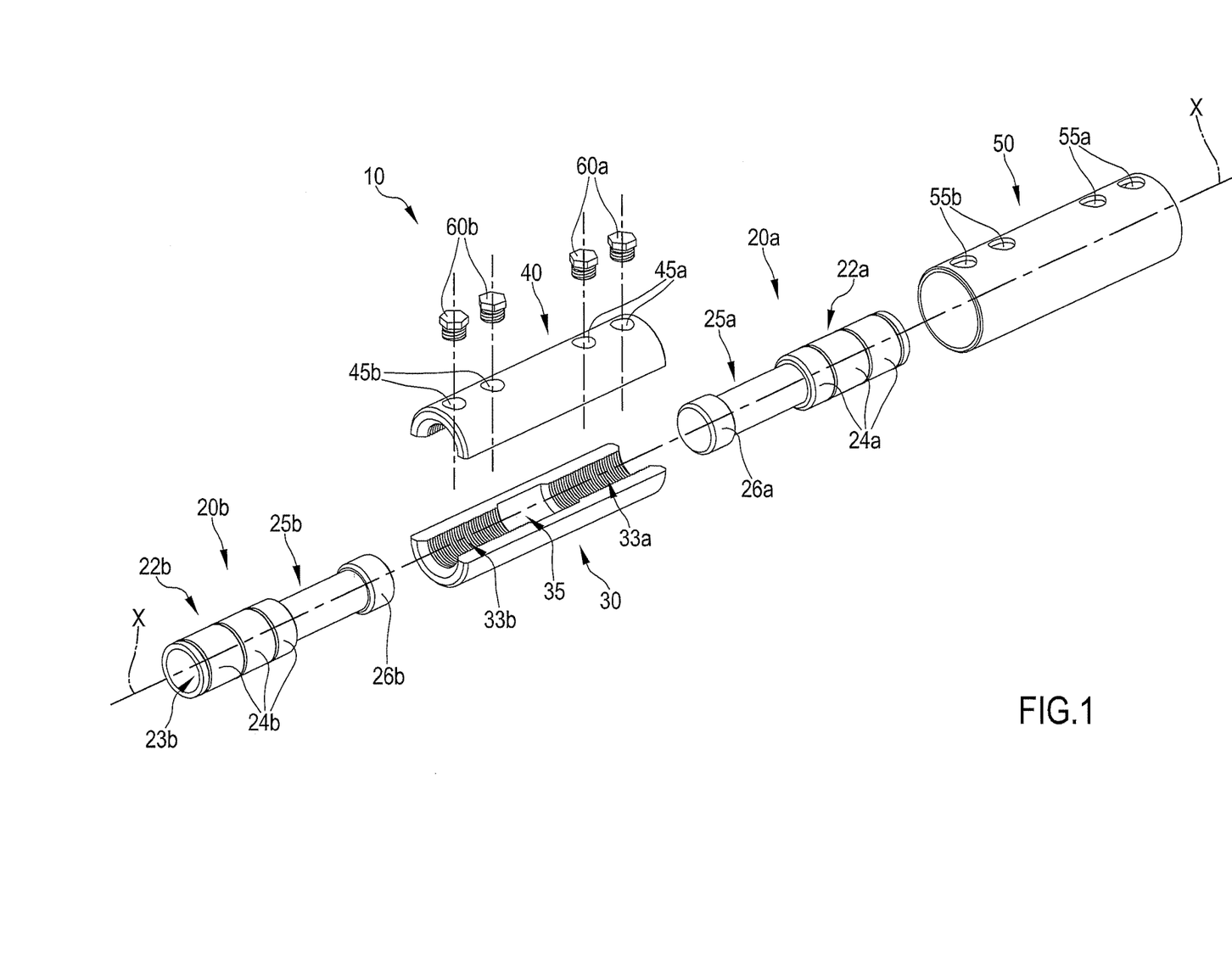
FIG. 1 is a schematic perspective view, in an exploded configuration, of an assembly for the electrical splice connection of cables, according to a first embodiment of the present invention.

As from FIG. 1, assembly 10 comprises a first compression connector 20a configured to be coupled to cable 100a and a second compression connector 20b configured to be coupled to cable 100b.

Each compression connector 20a, 20b comprises a crimping portion 22a, 22b configured to be crimped onto conductors 101a, 101b of cables 100a, 100b, respectively.

Each compression connector 20a, 20b further comprises a spigot 25a, 25b having a given cross-sectional size.

Each crimping portion 22a, 22b is defined at a first axial portion of the respective compression connector 20a, 20b while each spigot 25a, 25b is defined at a second axial portion of the respective compression connector 20a, 20b.

When compression connectors 20a, 20b are intended to be connected with conductors 101a, 101b made of the same material and having the same cross-sectional size, compression connectors 20a, 20b are identical to each other.

Should instead conductors 101a, 101b be made of different materials, each connectors 20a, 20b has its crimping portion 22a, 22b made of the same material of the respective conductors 101a, 101b which it is intended to be connected with. For example, connectors 20a, 20b having at least the crimping portion 22a, 22b made of aluminium are used with aluminium conductors 101a, 101b and connectors 20a, 20b having at least the crimping portion 22a, 22b made of copper are used with copper conductors 101a, 101b.

The material of the spigots 25a, 25b can be selected irrespectively from the material of the cable conductors 101a, 101b.

Should conductors 101a, 101b have different cross-sectional size, the crimping portion 22a, 22b of each connector 20a, 20b has a cross-sectional size selected according to the cross-sectional size of the conductors 101a, 101 which it is intended to be connected with. The cross-sectional size of the spigots 25a, 25b is still the same, irrespective of the cross-sectional size of the crimping portion 22a, 22b.

Connectors 20a, 20b are preferably tin plated in order to resist corrosive environments, for example salty air and moisture existent in offshore wind towers, as well as to prevent galvanic corrosion caused by the natural difference in electro-potential of different materials when connecting an aluminium connector 20a, 20b with copper conductors 101a, 101b.

Figure 2:
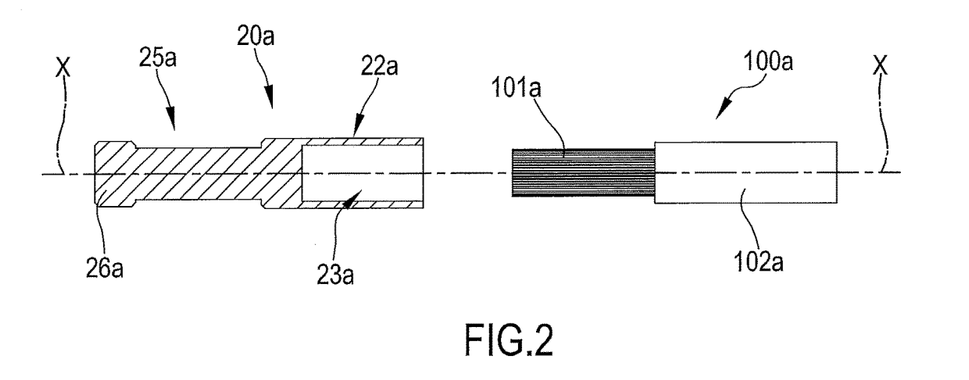
FIGS. 2-4 schematically show three steps of connecting a portion of the assembly of FIG. 1 to a cable.

As detailed in FIG. 2, each crimping portion 22a, 22b is substantially cylindrically-shaped and comprises an axial blind hole 23a, 23b configured to receive the end portion of the conductors 101a, 101b. Preferably, the diameter of the hole 23a, 23b is only slightly greater than that of the conductors 101a, 101b to be housed therein, so as to avoid any undesired offset between conductors 101a, 101b and centre line of the crimping portion 22a, 22b.

Suitable fitters (not shown) configured to be housed within holes 23a, 23b can be provided for small diameter conductors 101a, 101b in order to obtain the desired alignment between conductors 101a, 101b and centre line of the crimping portion 22a, 22b, thus reducing the number of different dies to be used.

As shown in FIGS. 1 and 5-8, each crimping portion 22a, 22b further comprises a plurality of crimping areas 24 arranged coaxially to the hole 23a, 23b and configured to be crimped onto conductors 101a, 101b by proper tools not shown, such as for example mechanical or hydraulic heads as well as different dies, as per cable specifications. The crimping areas 24 are not depicted in FIGS. 2-4.

Thanks to the provision of the crimping portions 22a, 22b, conductors 101a, 101b can be firmly locked in position within connectors 20a, 20b.

Each spigot 25a, 25b is preferably defined by a solid body portion having a substantially cylindrical shape and comprising, at the free end portion thereof, an enlarged head 26a, 26b.

The cross-sectional size of spigots 25a, 25b is preferably equal to or greater than the cross-sectional size of the conductors 101a, 101b.

In addition to having a given cross-sectional size, spigots 25a, 25b preferably also have the same length, so that spigots 25a, 25b are identical to each other irrespective of the conductor materials and sizes.

The provision of connectors 20a, 20b designed as above allows pre-installation of connectors 20a, 20b onto cables 100a, 100b at different remote locations, thus eliminating the use of crimping tool at the installation area.

Figure 5:
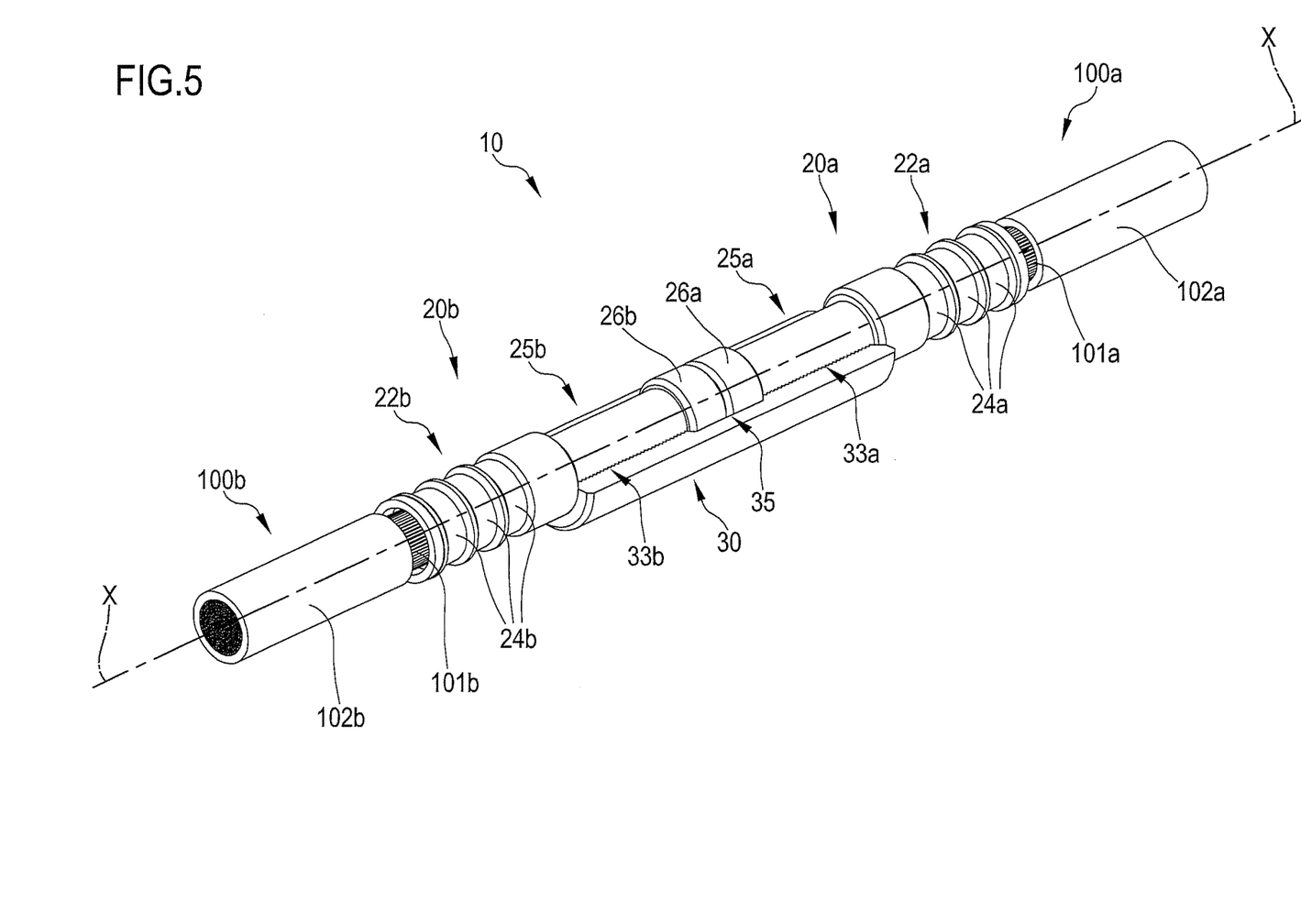
FIGS. 5-8 schematically show four steps of connecting two cables by the assembly of FIG. 1.
Figure 6:
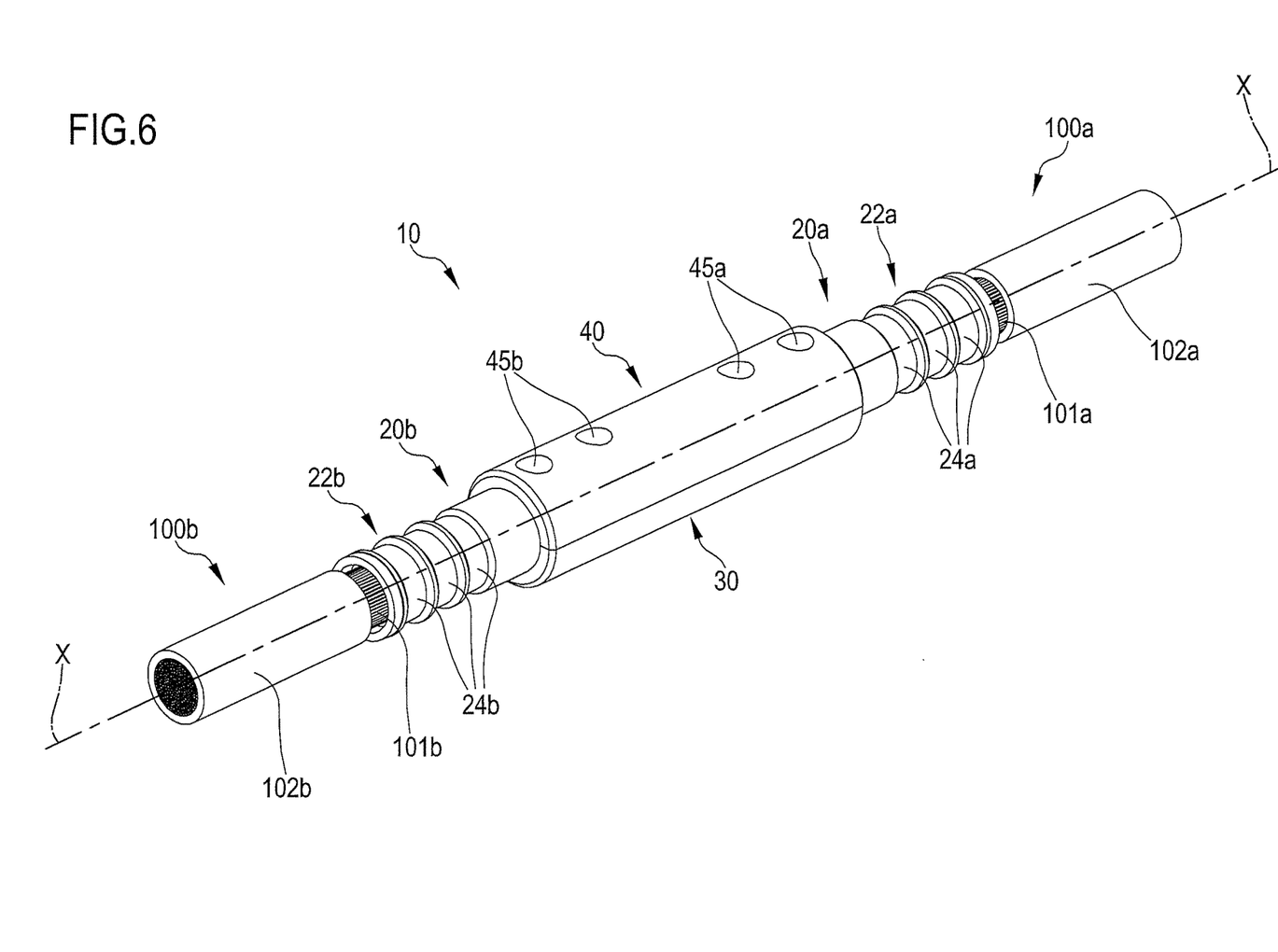

Assembly 10 further comprises a first open shell 30 configured to accommodate the spigots 25a, 25b, as shown in FIG. 5, and a second open shell 40 configured to be fastened to open shell 30 to wrap and hold in position the spigots 25a, 25b, as shown in FIG. 6.

In the exemplary embodiment shown in the attached figures, both open shells 30 and 40 have a substantially semi-cylindrical shape and are made of aluminium, preferably tin plated in order to prevent corrosion.

Both open shells 30 and 40 comprise, at an axially central portion of a radially inner surface thereof, a recessed portion 35 for accommodating the enlarged head 26a, 26b of the spigots 25a, 25b, as shown in FIG. 1. At the opposite axial portions with respect to the abovementioned recessed portion 35, serrations 33a, 33b are provided in both shells 30 and 40.

In the embodiment shown in the attached drawings, the recessed portion 35 lacks the serrations 33a, 33b.

Advantageously, serrations 33a, 33b break through oxide/s formed on the surface of the spigots 25a, 25b thus reducing the resistance at the shell-spigot interface while increasing the grip between them.

Thanks to the elongated shape of both open shells 30 and 40 and spigots 25a, 25b, a large contact surface at the shell-spigot interface is advantageously provided.

As the spigots 25a, 25b have a given size, open shells 30 and 40 have a given size, depending on the spigot size, irrespective of the conductor sizes.

In the embodiment shown in FIGS. 1-8, open shell 40 comprises a plurality of through holes 45a, 45b configured to receive respective locking screws 60a, 60b (FIGS. 1 and 6).

More specifically, at least one through hole 45a is arranged at a first end portion of the open shell 40. Said at least one through hole 45a is located at a radially outer position with respect to spigot 25a (FIG. 6). Analogously, at least another through hole 45b is arranged at the opposite end portion of the open shell 40 (FIG. 6). Said at least one through hole 45b is located at a radially outer position with respect to spigot 25b.

As shown in FIGS. 1-8, two through holes 45a and two through holes 45b are preferably provided, wherein through holes 45a are arranged at the first end portion of the open shell 40 and through holes 45b are arranged at the opposite end portion of the open shell 40.

In an embodiment not shown, open shell 30 comprises the above through holes 45a, 45b too. In this case, open shells 30 and 40 are fully identical to each other.

Figure 7:
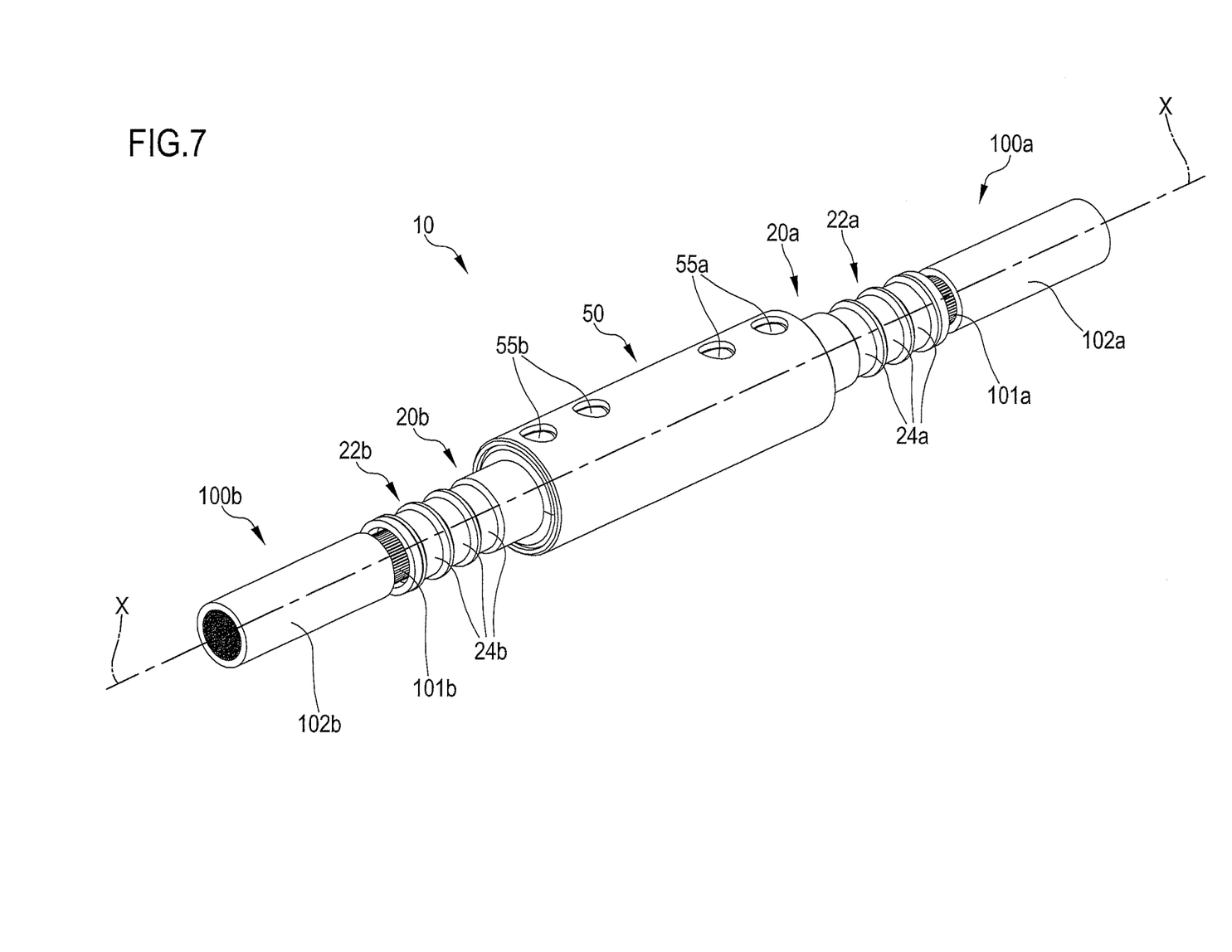
Figure 8:
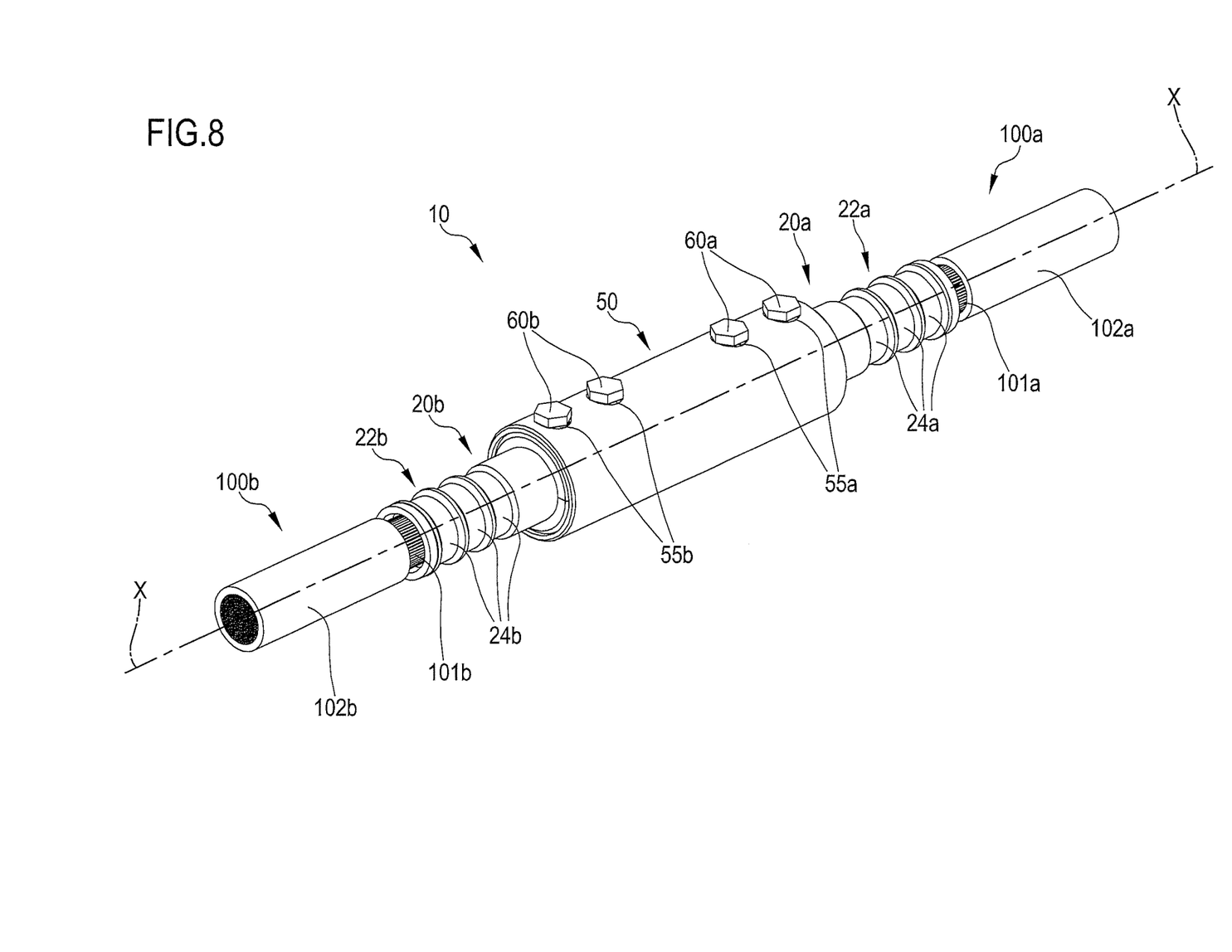

In the embodiment shown in the FIGS. 1-8, the mutual fastening of open shells 30 and 40 is obtained by positioning, in a radially outer position thereof, an outer sleeve 50 (shown in FIGS. 1, 7 and 8). In the present case, the outer sleeve 50 totally surrounds open shells 30 and 40.

Sleeve 50 is preferably made of aluminium, more preferably tin plated in order to resist to corrosive environments.

Sleeve 50 comprises a number of through holes 55a, 55b equal to the number of through holes 45a, 45b, each through hole 55a, 55b being intended to be aligned to a respective first through hole 45a, 45b so as to allow locking screws 60a, 60b inserted in through holes 55a, 55b to pass through holes 45a, 45b and to press onto the spigots 25a, 25b, thus firmly holding in position spigots 25a, 25b.

Through holes 45a, 45b and 55a, 55b are preferably aligned in a single longitudinal line, thus requiring a single direction to access the locking screws 60a, 60b during installation.

Preferably, locking screws 60a, 60b are shear bolts which, more preferably, are made of brass. This provision allows avoiding or at least reducing cold welding of locking screws 60a, 60b with aluminium open shells 30 or 40 and outer sleeve 50, which would cause premature shearing of the bolts.

Since the locking screws 60a, 60b press onto the spigots 25a, 25b, conductors 101a, 101b are neither damaged nor moved during installation. As the cross-sectional size of spigots 25a, 25b remains constant even for different conductor sizes, the locking screws will shear at substantially the same height all the times, thus eliminating or at least reducing risk of shearing failure or of shearing at incorrect heights, which would cause, for example, the sheared bolts to have undesired sharp edges radially projecting outside the assembly 10.

Advantageously, locking screws 60a, 60b allow using at the installation area single, universally available tools, such as a spanner or a wrench.

Figure 9:
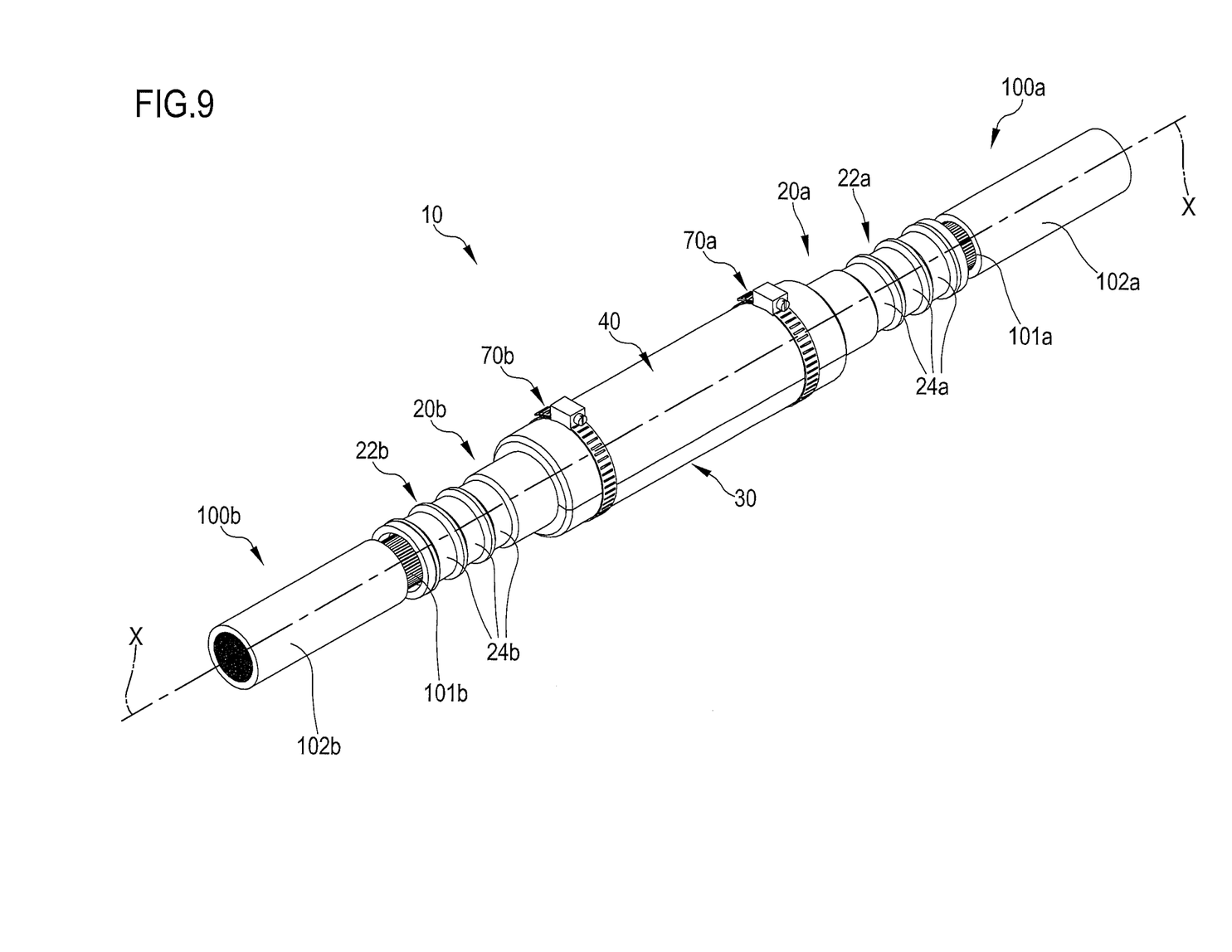
FIG. 9 schematically shows an alternative embodiment of the present invention.

In a different embodiment shown in FIG. 9, at least one clamp 70a, 70b can be provided to fasten open shells 30 and 40 to each other. For example, as shown in FIG. 9, two clamps 70a, 70b are provided, each clamp 70a, 70b being arranged at a respective end portion of the shells 30 and 40. Clamps 70a, 70b are first located over the shells 30 and 40 at the desired position and then tightened to fasten each other, thus steadily holding in position the spigots 26a, 26b arranged between them.

Figure 10:
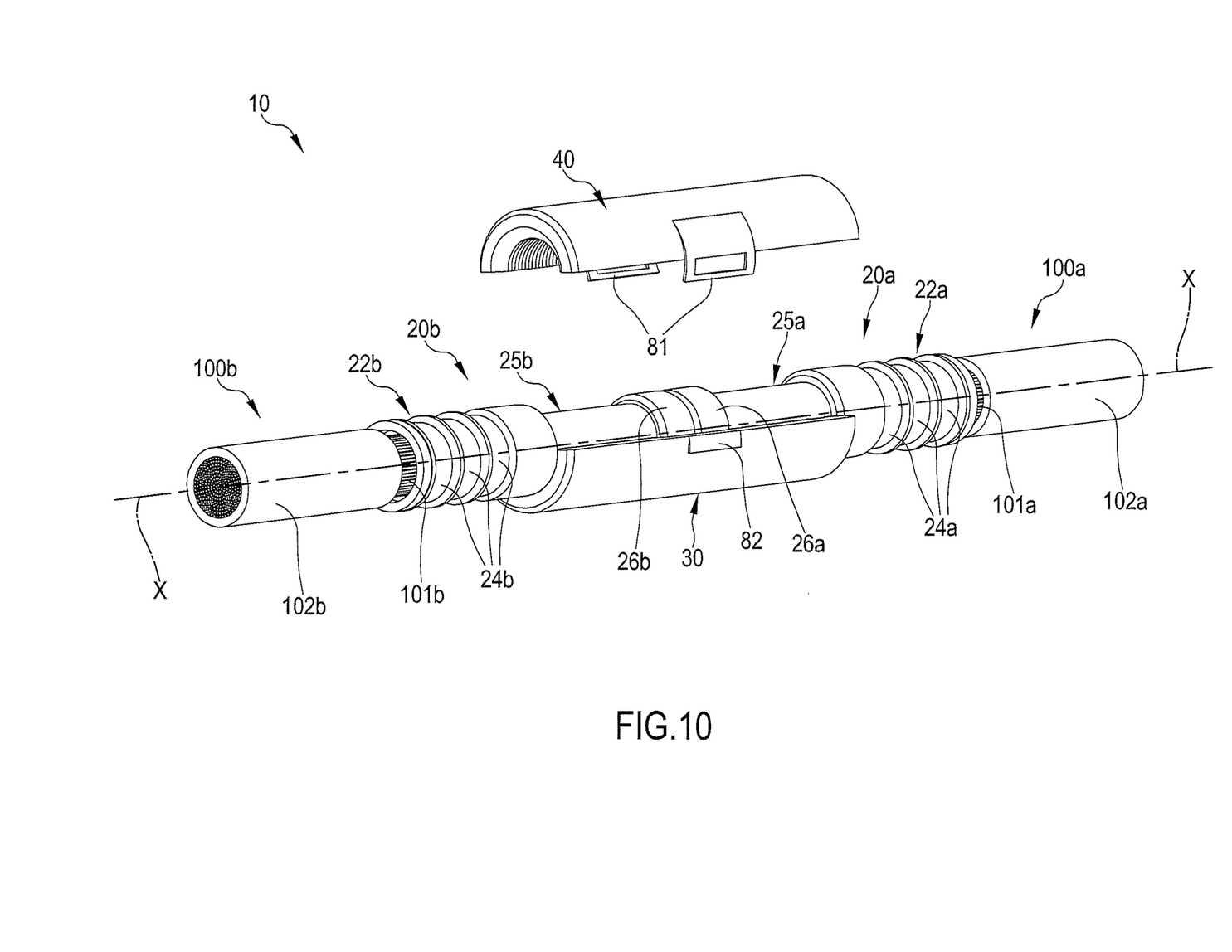
FIGS. 10 and 11 schematically show another alternative embodiment of the present invention.
Figure 11:
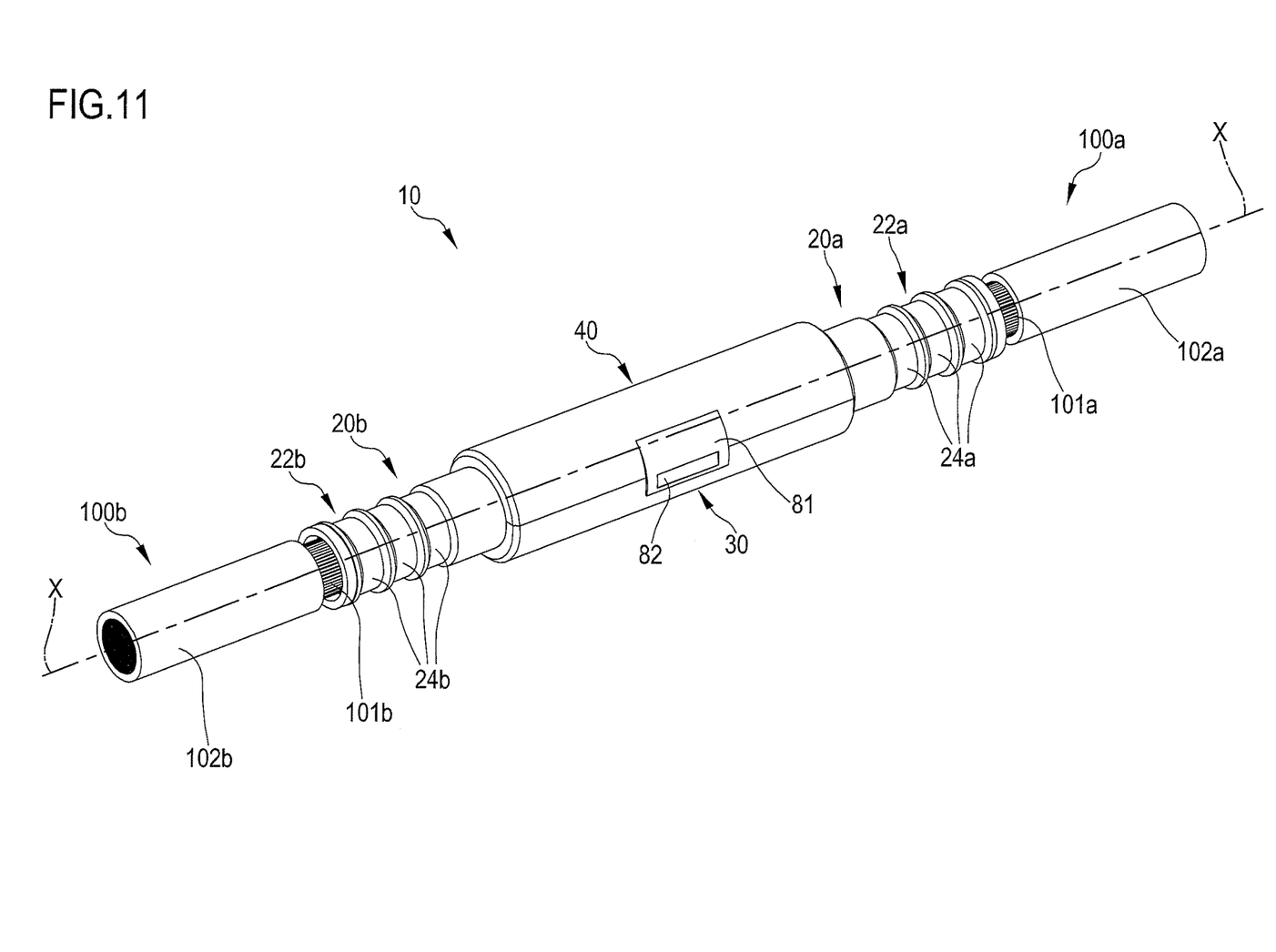

In a further embodiment shown in FIGS. 10 and 11, a snap coupling can be provided to fasten open shells 30 and 40 to each other. For example, a projecting grooved tongue 81 can be provided at both the longitudinal sides of one of shells 30, 40 (shell 40 in FIGS. 10 and 11) and a spline 82 can be provided at both the longitudinal sides of the other shell 30, 40 (shell 30 in FIGS. 10 and 11) to snap housing a respective one of the projecting grooved tongues 81.

In the embodiments of FIGS. 9-11, one or more through holes 45 can be provided in open shell 30 and/or 40 for the insertion of locking screws, for example shear bolts, as auxiliary fastening members.

In another further embodiment, both the open shells 30, 40 comprise at least two through holes 45a, 45b configured to receive respective locking screws 60a, 60b. According to this embodiment, the mutual fastening of open shells 30 and 40 is obtained by inserting locking screws 60a, 60b, preferably shear bolts, into the at least four through holes.

The assembly 10 described above allows connecting different material and size cable conductors 101a, 101b with no orientation issues at the installation area, thus eliminating stress induced into the cables 100a, 100b during installation.

The assembly 10 is capable of withstanding mechanical forces it is subjected to, including vibration.

Figure 3:
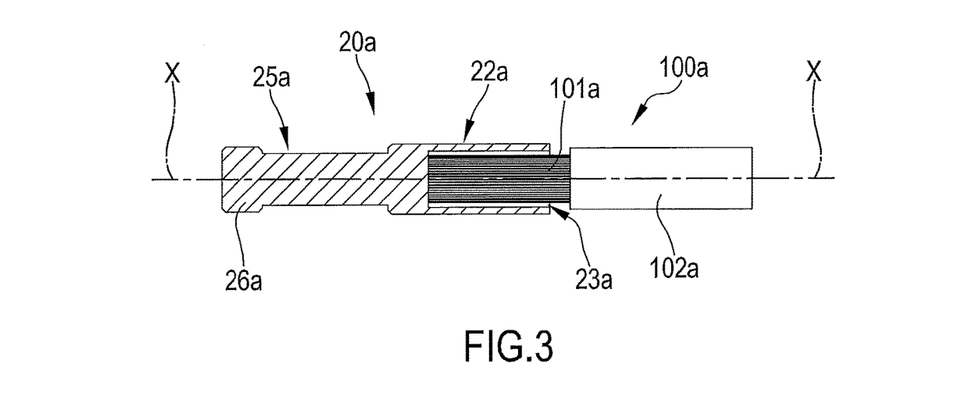

As from FIGS. 2-3, the electrical connection of cables 100a, 100b comprises at first preparing the cable ends to expose conductors 101a, 101b which are then inserted into the respective blind hole 23a, 23b of connectors 20a and 20b. These operations can be done at different locations, even far away from the installation area.

Figure 4:
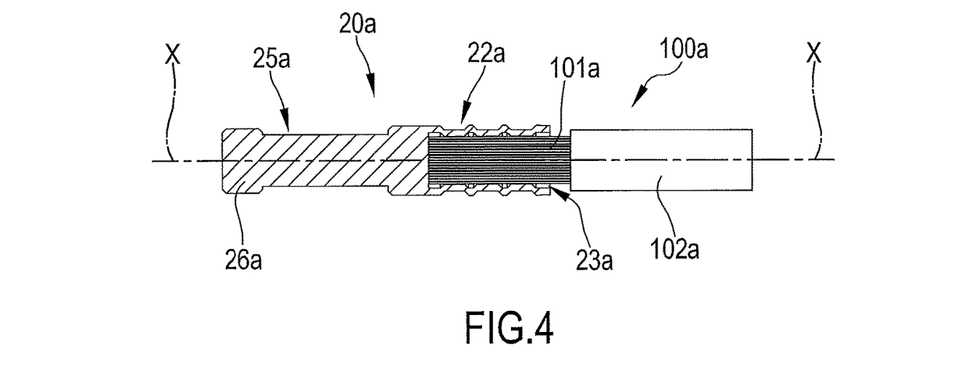

Then, as from FIG. 4, the crimping portions 22a, 22b of connectors 20a, 20b are crimped onto conductors 101a, 101b, so as to obtain pre-connectorized cables 100a, 100b. This operation can be done at the same location of the above operation or at a different location, even far away from the installation area.

Cables 100a, 100b so pre-connectorized are then connected with each other at the installation area, as detailed herein below.

If the outer sleeve 50 is used, like in the embodiment of FIGS. 1, 5-8, it is slid over one of the pre-connectorized cables 100a, 100b. In the case of vertical installation, the outer sleeve 50 is preferably made slid over the upper cable end. Tapes or cable ties can be used to hold the sleeve 50 in position.

Spigots 25a, 25b are aligned and then accommodated onto open shell 30, with the enlarged heads 26a, 26b arranged in the recessed portion 35 of the open shell 30, as from FIG. 5.

Open shell 40 is then fastened to open shell 30 to wrap spigots 25a 25b, as from FIG. 6. Shells 30 and 40 can be held in position by tapes or cable ties.

As from FIG. 7, sleeve 50 is then positioned over shells 30 and 40. Through holes 55a, 55b are aligned to through holes 45a, 45b upon having cut the above tapes or cable ties.

As from FIG. 8, locking screws 60a, 60b are inserted into through holes 55a, 55b and tightened to exert at predetermined pressure onto said spigots 25a, 25b until shear occurs.

Clamps 70a, 70b or snap fit members 81, 82 can be used in place of sleeve 50 to fasten open shells 30 and 40 to each other, as discussed above.

Of course a man skilled in the art can make further modifications and changes to the invention described above in order to meet specific and contingent application requirements, these modifications and changes falling in any case within the scope of protection as defined by the following claims.

The invention claimed is:

1. An assembly for electrical splice connection of cables, the assembly comprising:
    a first connector, comprising a first spigot and a first crimping portion, configured to be crimped onto a first cable conductor;
    a second connector, comprising a second spigot and a second crimping portion, configured to be crimped onto a second cable conductor;
    a first open shell configured to accommodate the first and second spigots; and
    a second open shell configured to be fastened to the first open shell so as to wrap and hold in position the first and second spigots;
    wherein each of the first spigot and the second spigot comprises, at a respective free end portion thereof, an enlarged head, and
    wherein each of the first open shell and the second open shell comprises, at an axially central portion of a radially inner surface thereof, a recessed portion for accommodating the enlarged heads of the first spigot and the second spigot.

2. The assembly of claim 1, further comprising an outer sleeve configured to at least partly surround the first open shell and the second open shell.

3. The assembly of claim 2, wherein the outer sleeve comprises at least two first through holes, each of the at least two first through holes configured to align with a respective through hole of at least two second through holes formed in at least one of the first open shell and the second open shell, and
    wherein the assembly further comprises at least one locking screw.

4. The assembly of claim 1, wherein the first open shell and the second open shell are substantially identical to each other.

5. The assembly of claim 1, wherein each of the first and second cable conductors has a respective cross-sectional size, and
    wherein each of the first crimping portion and the second crimping portion has a cross-sectional size selected according to the cross-sectional size of a respective cable conductor of the first and second cable conductors.

6. The assembly of claim 1, wherein the first spigot and the second spigot are substantially identical.

7. The assembly of claim 1, wherein at least one of the first and second open shells comprises, at a radially inner surface thereof, a serration.

8. The assembly of claim 1, wherein each of the first and second cable conductors has cross-sectional size, and
wherein each of the first spigot and the second spigot has a cross-sectional size which is equal to, or greater than, the cross-sectional size of a respective cable conductor of the first and second cable conductors.

9. The assembly of claim 1, wherein the first and second cable conductors are made of a respective material, and
wherein each of the first crimping portion and the second crimping portion is made of the same material as that of a respective cable conductors of the first and second cable conductors.

10. The assembly of claim 3, wherein the at least one locking screw is a shear bolt.

11. A method for electrical splice connection of cables, the method comprising:
providing a first connector, comprising a first spigot and a first crimping portion;
providing a second connector, comprising a second spigot and a second crimping portion;
crimping the first crimping portion onto a first cable conductor;
crimping the second crimping portion onto a second cable conductor;
accommodating the first and second spigots on a first open shell; and
fastening a second open shell to the first open shell so as to wrap and hold in position the first and second spigots.

12. The method of claim 11, wherein the fastening of the second open shell to the first open shell comprises:
positioning an outer sleeve in a radially outer position with respect to the first open shell and the second open shell, the outer sleeve comprising at least two first through holes;
aligning each of the at least two first through holes to a respective through hole of at least two second through holes formed in at least one of the first open shell and the second open shell; and
inserting a locking screw into each of the at least two first through holes and the at least two second through holes.

13. The method of claim 11, wherein the accommodating of the first and second spigots on the first open shell comprises accommodating an enlarged head provided at a free end portion of each of the first and second spigots onto a recessed portion provided at a central portion of the first open shell.

14. An assembly for electrical splice connection of cables, the assembly comprising:
a first connector, comprising a first spigot and a first crimping portion, configured to be crimped onto a first cable conductor;
a second connector, comprising a second spigot and a second crimping portion, configured to be crimped onto a second cable conductor;
first and second open shells configured to accommodate the first and second spigots; and
an outer sleeve configured to at least partly surround the first open shell and the second open shell;
wherein the first and second open shells are configured to be fastened together to hold the first and second spigots, and
wherein the outer sleeve comprises at least two through holes.

15. The assembly of claim 14, wherein the first open shell and the second open shell have a same length.

16. The assembly of claim 14, wherein the first open shell and the second open shell have a same diameter.

17. The assembly of claim 14, wherein the first spigot and the second spigot have a same length.

18. The assembly of claim 14, wherein the first spigot and the second spigot have a same diameter.

* * * * *